US009699562B2

(12) United States Patent
Kim et al.

(10) Patent No.: US 9,699,562 B2
(45) Date of Patent: Jul. 4, 2017

(54) AUDIO OUTPUT CONTROL METHOD AND APPARATUS

(71) Applicant: Samsung Electronics Co., Ltd., Gyeonggi-do (KR)

(72) Inventors: Kyungtae Kim, Gyeonggi-do (KR); Jeongmin Park, Gyeonggi-do (KR); Seungeun Lee, Seoul (KR); Eunjung Hyun, Seoul (KR); Pyeonggyu Jin, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 137 days.

(21) Appl. No.: 14/541,443

(22) Filed: Nov. 14, 2014

(65) Prior Publication Data
US 2015/0131825 A1 May 14, 2015

(30) Foreign Application Priority Data

Nov. 14, 2013 (KR) .......................... 10-2013-0138576

(51) Int. Cl.
*H04R 5/04* (2006.01)
*H04S 3/00* (2006.01)
*G06F 3/16* (2006.01)
*H04S 5/00* (2006.01)
*H04R 5/02* (2006.01)

(52) U.S. Cl.
CPC .................. *H04R 5/04* (2013.01); *G06F 3/16* (2013.01); *G06F 3/165* (2013.01); *H04R 5/02* (2013.01);
(Continued)

(58) Field of Classification Search
CPC .. H04R 5/04; H04R 2420/01; H04R 2420/05; H04R 5/02; H04R 2499/11; H04R 2420/03; H04R 2420/07; H04R 2227/005; H04R 27/00; H04B 3/00; H04H 20/61; H04S 3/00; H04S 5/00; H04S 2420/07
USPC ............................... 381/300, 307, 77, 80, 85
See application file for complete search history.

(56) References Cited

U.S. PATENT DOCUMENTS

2005/0152557 A1* 7/2005 Sasaki ..................... H04S 7/302
381/58
2006/0287746 A1* 12/2006 Braithwaite ..... H04N 21/23432
700/94

(Continued)

FOREIGN PATENT DOCUMENTS

| KR | 10-2007-0033860 | 3/2007 |
| KR | 10-2007-0053505 | 5/2007 |
| KR | 10-0754210 B1 | 9/2007 |

*Primary Examiner* — Davetta W Goins
*Assistant Examiner* — Oyesola C Ojo

(57) ABSTRACT

An audio output control method and apparatus using a wired/wireless communication system is provided. An audio output control method of an audio output device connected to at least one other audio output device according to the present disclosure includes converting specific audio data to at least one modified audio signal designated to the respective audio output devices, playing at least one of the modified audio signals through a channel designated to the specific audio data, and transmitting a remaining of the modified audio signals to the at least one other audio output device, wherein the modified audio signals include at least one of sound sources and channel characteristics of the specific audio data.

15 Claims, 13 Drawing Sheets

(52) U.S. Cl.
CPC ...... *H04R 2420/01* (2013.01); *H04R 2420/03* (2013.01); *H04R 2420/05* (2013.01); *H04R 2420/07* (2013.01); *H04R 2499/11* (2013.01); *H04S 3/00* (2013.01); *H04S 5/00* (2013.01); *H04S 2420/07* (2013.01)

(56) References Cited

U.S. PATENT DOCUMENTS

| | | | |
|---|---|---|---|
| 2007/0038999 A1* | 2/2007 | Millington | H04J 3/0664 718/100 |
| 2007/0087686 A1* | 4/2007 | Holm | H04S 7/30 455/3.06 |
| 2007/0133831 A1 | 6/2007 | Kim et al. | |
| 2007/0211907 A1* | 9/2007 | Eo | H04R 5/04 381/79 |
| 2010/0105325 A1* | 4/2010 | Halla | H04S 3/00 455/41.2 |
| 2011/0069652 A1* | 3/2011 | Kakani | H04L 12/185 370/312 |
| 2011/0090837 A1* | 4/2011 | Duchscher | H04L 1/0057 370/312 |
| 2011/0112843 A1* | 5/2011 | Shimada | G10L 21/0272 704/500 |
| 2012/0237054 A1 | 9/2012 | Eo et al. | |
| 2015/0326815 A1* | 11/2015 | Masuda | H04N 5/642 381/306 |

* cited by examiner

AUDIO OUTPUT CONTROL METHOD AND APPARATUS

CROSS-REFERENCE TO RELATED APPLICATION(S) AND CLAIM OF PRIORITY

The present application is related to and claims the benefit under 35 U.S.C. §119(a) of a Korean patent application filed on Nov. 14, 2013 in the Korean Intellectual Property Office and assigned Serial No. 10-2013-0138576, the entire disclosure of which is hereby incorporated by reference.

TECHNICAL FIELD

The present disclosure relates to an audio output control method and apparatus using a wired/wireless communication system.

BACKGROUND

In line with the advance of technologies, diverse electronic devices such as smartphone and tablet Personal Computer (PC) are popularized. As one of the electronic devices, the portable terminal is used in various fields for its convenient usability and portability. Recently, the advance of multimedia technologies spurs research and development in high quality image recording and playback techniques. A recent focus of interest is in $3^{rd}$ Dimensional (3D) sound technology as well as 3D video technology.

Recently, a new functionality is proposed to play 3D sound in such a way of allocating audio channels to a plurality of electronic devices connected through wired/wireless connections.

SUMMARY

To address the above-discussed deficiencies, it is a primary object to provide an audio output control method and apparatus that is capable of outputting multichannel audio data in various formats using a plurality audio output devices connected via wire or wirelessly.

Also, the present disclosure aims to provide an audio output control method and apparatus that is capable of providing more accurate and effective audio service by modifying the unique channel characteristic of the audio data.

In accordance with an aspect of the present disclosure, an audio output control method of an audio output device connected to at least one other audio output device includes converting specific audio data to at least one modified audio signal designated to the respective audio output devices. The audio control method also includes playing at least one of the modified audio signals through a channel designated to the specific audio data. The audio control method also includes transmitting a remaining of the modified audio signals to the at least one other audio output device, wherein the modified audio signals include at least one of sound sources and channel characteristics of the specific audio data.

In accordance with another aspect of the present disclosure, a device includes a speaker, a communication unit, a storage unit, and a control unit. The speaker outputs audio signals. The communication unit establishes a connection for communication with at least one other audio output device. The storage unit stores at least one of specific audio data and conversion information and modified audio signals for playing the specific audio data in collaboration with the at least one other audio output device. The control unit controls converting specific audio data to at least one modified audio signal designated to the respective audio output devices. The control unit also controls playing at least one of the modified audio signals through a channel designated to the specific audio data. The control unit also controls transmitting a remaining of the modified audio signals to the at least one other audio output device, wherein the modified audio signals include at least one of sound sources and channel characteristics of the specific audio data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method.

Example embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure. This aims to omit unnecessary description so as to make the subject matter of the present disclosure clear.

The audio output device according to an embodiment of the present disclosure may be a part of an electronic device. The electronic device may be any or a combination of smartphone, tablet PC, mobile phone, video phone, electronic book (e-book) reader, desktop PC, laptop PC), netbook computer, Personal Digital Assistant (PDA), Portable Multimedia Player (PMP), MP3 player, mobile medical appliance, electronic bracelet, electronic necklace, electronic appcessory, camera, wearable device, electronic clock, wrist watch, smart white appliance (e.g. refrigerator, air conditioner, intelligent artificial robot, Television (TV), Digital Video Disk (DVD) player, audio, oven, microwave oven, laundry machine, vacuum cleaner, electronic frame, and the like), medical device (e.g. Magnetic Resonance Angiography (MRA), Magnetic Resonance Imaging (MRI), Computed Tomography (CT), camera, and ultrasonic device), navigation device, Global Positioning System (GPS) receiver, Event Data Recorder (EDR), Flight Data Recorder (FDR), set-top box, TV box (e.g. Samsung HomeSync™, Apple TV™, and Google TV™), electronic dictionary, car infotainment device, electronic equipment for ship (e.g. marine navigation device and gyro compass), avionics device, security device, electronic clothing, camcorder, game console, Head-Mounted Display (HMD), flat panel display device, electronic frame, furniture or part of building/construction, electronic board, electronic signature receiving device, and projector.

Although the description is directed to an electronic device as the audio output device, the present disclosure is not limited thereto.

Figure 1:
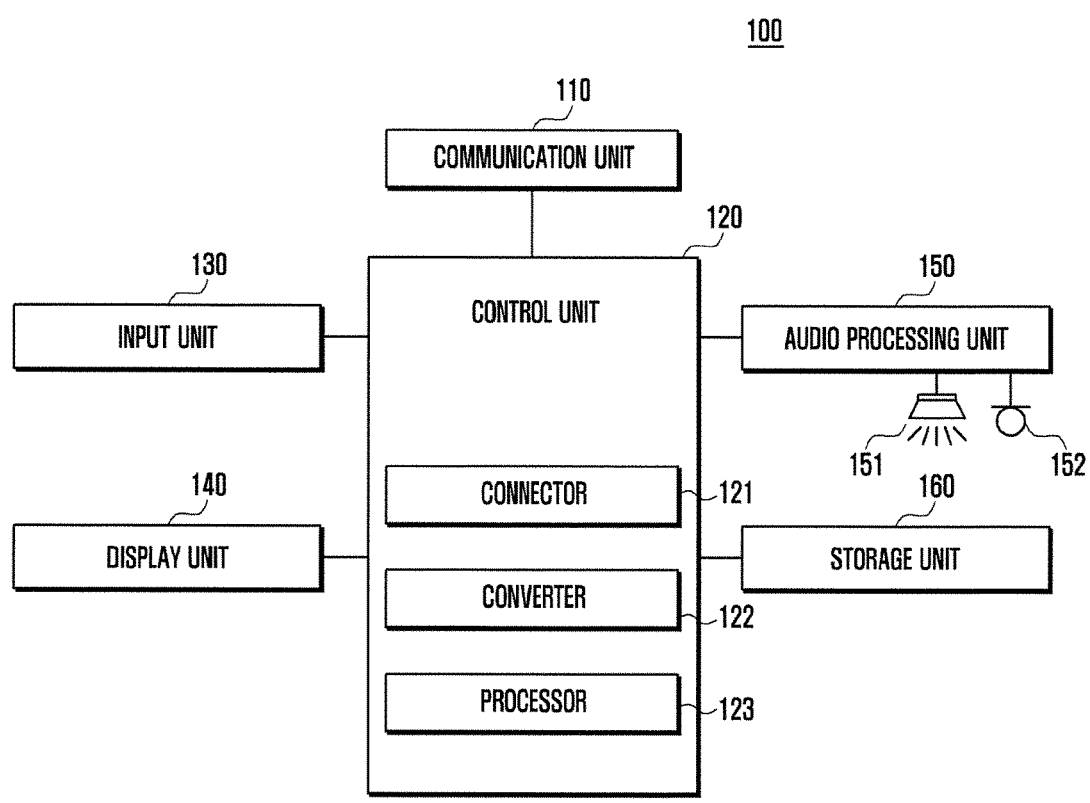
FIG. 1 illustrates a block diagram of a configuration of the electronic device according to various embodiments of the present disclosure.

FIG. 1 illustrates a block diagram of a configuration of the electronic device according to various embodiments of the present disclosure.

As shown in FIG. 1, the electronic device 100 according to an embodiment of the present disclosure includes a communication unit 110, a control unit 120, an input unit 130, a display unit 140, an audio processing unit 150, a microphone 152, a speaker 151, and a storage unit 160.

The communication unit 110 is responsible for establishing a communication channel with a mobile communication network for voice, video, and data communication under the control of the control unit 120. The communication unit 110 may be activated in response to a communication function request of the user and external request or according to preconfigured scheduling information. The communication unit 110 may output and/or receive communication signal in the activation process.

According to an embodiment, the communication unit 110 may include at least one of a cellular communication module, a wireless Internet module, a short range communication module, and a location information module.

The cellular communication module communicates radio signals with at least one of a base station, a terminal, and a server. The radio signals may include voice call signal, video call signal, and various types of data carrying text and multimedia. The wireless Internet module is responsible for wireless Internet access function. Examples of the wireless Internet technologies include Wireless Local Area Network (WLAN) or Wi-Fi, Wireless Broadband (WiBro), World Interoperability for Microwave Access (WiMAX), High Speed Downlink Packet Access (HSDPA), and the like. The short range communication module is responsible for short range communication. Examples of the short range communication technology include Bluetooth, Radio Frequency Identification (RFID), Infrared Data Association (IrDA), Ultra Wideband (UWB), and ZigBee. The location information module may check the location of the electronic device using one of Global Positioning System (GPS), Galileo, Global Orbiting Navigational Satellite System (GLONASS), COMPASS, and Quasi-Zenith Satellite System (QZSS).

The communication unit 110 also may include network interface (e.g. LAN card) or modem for connection to a network (e.g. Internet, Local Area Network (WLAN), Wide Area Network (WAN), Telecommunication network, cellular network satellite network, and Plain Old Telephone Service (POTS)).

The control unit 120 controls power supply from a battery to the internal components. If the electronic device 100 powers on, the control unit 120 controls the booting process of the electronic device 100 and executes application programs stored in the program region for carrying out the functions according to the user settings. The control unit 120 may include at least one Application Processor (AP) and/or at least one Communication Processor (CP).

According to an embodiment of the present disclosure, the control unit 120 includes a connector 121, a converter 122, and a processor 123.

The connector 121 is responsible of connection of a plurality of audio output devices (e.g. speaker and electronic device) within a predetermined distance and controlling audio volume of the audio output device. The connector 121 searches for audio output devices around by means of the communication unit 110 and establishes wireless communication channels with the retrieved audio output devices through authentication procedure. The connector 121 may detect connection of a cable such as Universal Serial Bus (USB), check the audio output device for specific data communication, and establish a wired data communication channel.

According to an embodiment, the connector 121 may perform data communication with the audio output devices to check existence of specific audio data.

According to an embodiment, the connector 121 may configure the electronic device 100 as a master terminal and at least one connected audio output device as a slave terminal. The connector 121 may control the operation of audio channel setup and volume of the audio output device configured as the slave terminal.

The converter 122 converts specific audio data to various formats depending on the channel characteristics so as to be played by the electronic device 100 and the at least one audio output device.

According to an embodiment, the converter 122 may generate conversion information for branching out specific audio data to the electronic device 100 and the at least one audio output device. The converter may generate the audio signals to be played by at least one of the electronic device 100 and the audio output device. In this embodiment, the modified audio signal may be the signal different from the multichannel audio signal supported in a specific audio data format.

According to an embodiment, the converter 122 may generate the conversion information with various channel configurations of the audio output device based on the location configuration information of the at least one connected audio output device.

According to an embodiment, the converter 122 may detect playback stop or connection release of the at least one audio output device. If the playback stop or connection release is detected, the converter 122 may reconfigure the conversion information.

The processor 123 is responsible for outputting at least one of the conversion information and modified audio signal to the audio output device. The processor 123 is responsible for synchronizing the output timing of the modified audio signals among the electronic device and the at least one audio output device. In order to accomplish this, the processor 123 may generate a synchronization signal for playback time synchronization with the at least one audio output device.

The input unit 130 generates various input signals necessary for the operation of the terminal. The input unit 130 generates user setting and terminal function control signals to the control unit 120. The control unit 120 may perform control function in response to the input signal generated in response to the key input. The input unit 130 may include a touch panel, a pen sensor, and keys. The touch panel may be implemented in one of capacitive type, resistive type, infrared type, microwave type to recognize the touch input made by the user. The touch panel may further include a controller (not shown). The capacitive type touch panel may be configured to detect proximity as well as direct touch. The pen sensor may be implemented with a separate pen recognition sheet in the same way of detecting the output input made by the user. The keys may include at least one of mechanical keys and touch keys.

The display unit 140 is responsible for presenting image or data to the user. The display unit may include a display panel. The display panel may be implemented with Liquid Crystal Display (LCD) or Active Matrix Organic Light Emitting Diode (AMOLED). In this embodiment, the display unit 140 may include a controller for controlling the display panel. The display panel may be implemented to be flexible, transparent, and/or wearable. The display unit 140 may be integrated with the touch panel to form a touchscreen. For example, the touchscreen may be implemented with the display panel and the touch panel layered into an integrated module.

The audio processing unit 150 may include a speaker 151) for outputting the audio data being communicated in the call session, included in a message, and stored in the storage unit 160) and a microphone (MIC) 152 for collecting the user's voice and other sound. The audio processing unit 150 may convert sound wave to electric signal and vice versa. The audio processing unit 150 may include at least one of speaker, receiver, earphone, and microphone to converts input and out voice information.

The storage unit 160 may store the commands and data received from or generated by the control unit 120 and other components (e.g. display unit 140, input unit 130, and communication unit 110). The storage unit 160 stores the Operating System (OS) for booting up the electronic device and operating the aforementioned components, at least one application, messages transmitted/received through a network, and data generated by the application.

The storage unit 160 may include at least one of Internal and external memories. The internal memory may be implemented with at least one of volatile memory (e.g. Dynamic Random Access Memory (DRAM), Static RAM (SRAM), Synchronous Dynamic RAM (SDRAM), non-volatile memory (e.g. One Time Programmable Read Only Memory (OTPROM), Programmable ROM (PROM), Erasable and Programmable ROM (EPROM), Electrically Erasable and Programmable ROM (EEPROM), Mask ROM, and Flash ROM), Hard Disk Drive (HDD), and Solid State Drive (SSD). The external memory may be implemented with at least one of Compact Flash (CF), Secure Digital (SD), Micro-Secure Digital (MSD), Mini Secure Digital (Mini-SD), extreme Digital (xD), and Memory Stick.

According to an embodiment of the present disclosure, the electronic device (e.g. audio output device) may request a plurality of audio output devices capable of wired/wireless communication for connection and establish a connection with the device responding. In the following description, the description is directed to when the audio output device searching for nearby audio output devices and requesting the responding device for connection is referred to as master terminal and the audio output device responding to the request as slave terminal for explanation convenience.

Figure 2:
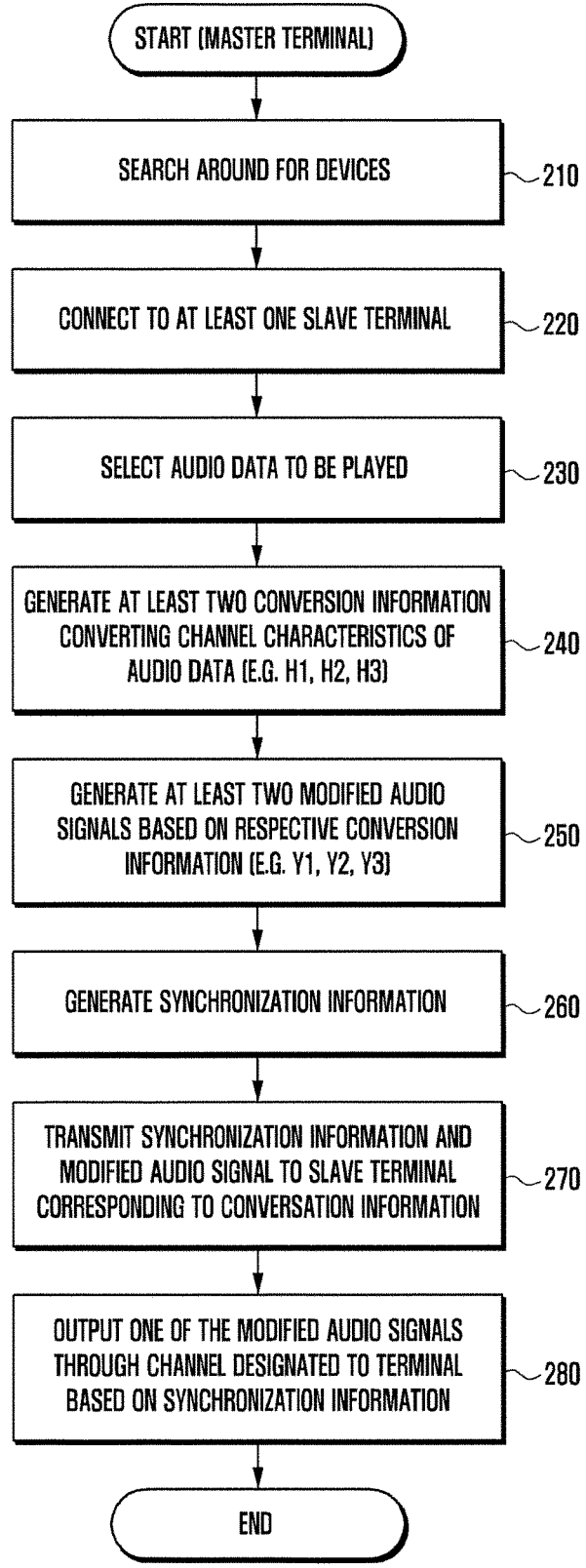
FIG. 2 illustrates a process of the operation procedure of the master terminal according to an embodiment of the present disclosure.
Figure 3:
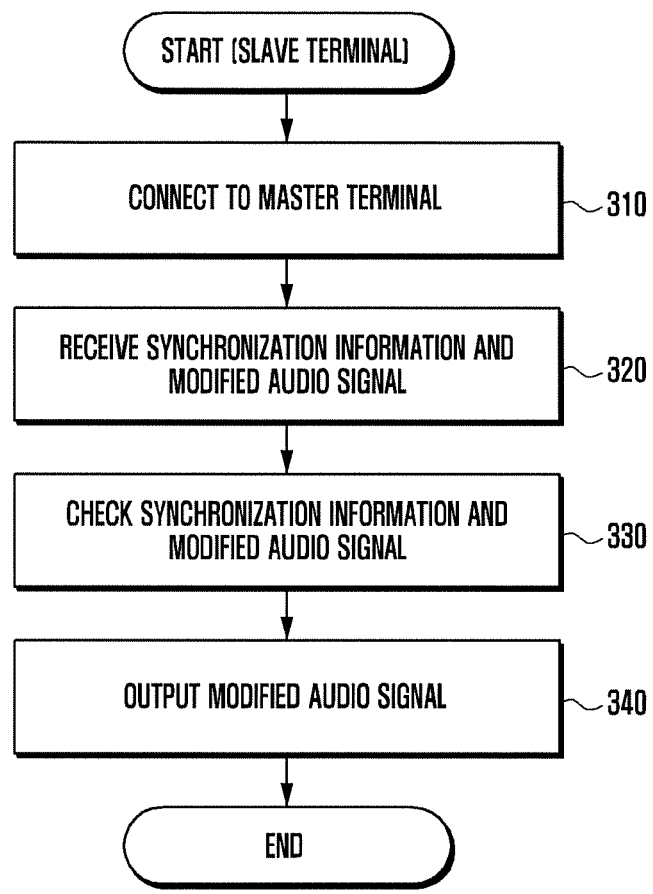
FIG. 3 i illustrates a process of the operation procedure of the slave terminal according to an embodiment of the present disclosure.

FIGS. 2 and 3 illustrate diagrams of audio output control methods according to various embodiments of the present disclosure. FIG. 2 illustrates a process of the operation procedure of the master terminal according to an embodiment of the present disclosure, and FIG. 3 is a flowchart illustrating the operation procedure of the slave terminal according to an embodiment of the present disclosure.

Referring to FIG. 2, the master terminal according to an embodiment of the present disclosure searches around for nearby audio output devices (i.e. slave terminals) capable of wired/wireless communication at operation 210. Here, the nearby audio output device may be a communication device but, without limitation thereto, include audio output device connected through a wire.

The master terminal establishes a connection with at least one salve terminal at operation 220. If a connection establishment request is detected, the master terminal checks the slave terminal.

According to an embodiment, the master terminal may search for the slave terminal and establish a short range communication channel through a pairing process using a short range communication technology. The master terminal also may discover the audio output device and establishes a communication channel with the audio output device by means of the Wi-Fi module or the mobile communication module.

According to an embodiment, the master terminal may detect connection of a cable such as USB, recognize an audio output device through specific data exchange, and establish wired data communication channel.

The master terminal detects an input for selecting the audio data to be played in collaboration with the connected slave terminal at operation 230.

The master terminal changes the channel characteristics of the selected audio data to and generates a plurality of conversion information for splitting the audio data into various sound sources at operation 240.

According to an embodiment, the master terminal may generate the conversion information using at least one of audio playback application program information, user-designated option information, slave terminal location information, and slave terminal audio output channel information.

The conversion information may include conversion matrix information for generating audio signal of specific sound source. The conversion information may include signal channel conversion or at least two channels conversion information. The audio signal conversion information may be generated differently depending on the slave terminal.

The conversion information may include audio channels different from the original audio channel of the audio data. In the example of the two channel audio data, the master terminal may generates the conversion information for converting the two channel audio data to various audio formats such as converted audio 2 channel audio signal, 3 channel audio single, voice signal-reinforced audio signal, and 4 channel audio signals.

According to an embodiment, if the master terminal is connected to two slave terminals, the master terminal may generate the first conversion information (H1) for converting the audio signal to the format playable by the master terminal, the second conversion information (H2) for converting the original audio signal to the format playable by the first slave terminal, and the third conversion information (H3) for converting the original audio signal to the format playable by the second slave terminal.

The master terminal generates at least two formats of the audio signals based on the conversion information at operation 250.

According to an embodiment, the master terminal may generate the modified audio signals through filter process based on the conversion information, sound source extraction and split process, and signal mix process.

The modified audio signal may be single or more channel audio signals. The modified audio signal may include the output channel information of the device.

According to an embodiment, the master terminal may generate the modified audio signal by performing linear filtering based on the conversion matrix included in individual conversion information.

For example, if the first conversion information (H1), the second conversion information (H2), and the third conversion information (H3) are generated, the maser terminal may generates the first modified audio signal (Y1) based on the first conversion signal (H1), the second modified audio signal (Y2) based on the second conversion signal (H2), and the third modified audio signal (Y3) based on the third conversion signal (H3).

The master terminal may generate the synchronization information for synchronizing playback time with at least one slave terminal connected to the master terminal at operation 260. The synchronization information may be generated based on at least one of wired/wireless communication capability information, music playback program capability information, and modified audio signal size information.

The master terminal sends the at least one slave signal the synchronization information and modified audio signal.

According to an embodiment, the master terminal may transmit the second modified audio signal (Y2) and the synchronization information to the first slave terminal, the third modified audio signal (Y3) and synchronization information to the second slave terminal.

According to an embodiment, audio signal transmission mode may be transmitted depending on the wired/wireless transmission protocol establishing the connection between the slave and master terminals.

The master terminal outputs the audio signal designated for the master terminal among the audio signals generated based on the synchronization information. The slave terminal connected to the master terminal may output the modified audio signal designated therefor in synchronization with the master terminal based on the synchronization information transmitted by the master terminal.

According to an embodiment, the master terminal may transmit the modified audio signal being played currently in streaming mode.

A description is made of the operation procedure of the slave terminal operating in collaboration with the master terminal with reference to FIG. 2.

Referring to FIG. 3, the slave terminal establishes a connection with the master terminal at operation 310. If a connection request for communication with the master terminal is detected, the slave terminal recognizes the master terminal.

The slave terminal receives the synchronization information and modified audio signal from the master terminal at operation 320. The slave terminal checks the synchronization information and modified audio signal to acquire the designated audio channel information at operation 330. The slave terminal output the converted audio system received through the audio channel allocated based on the synchronization information in synchronization with the master terminal at operation 340.

Figure 4:
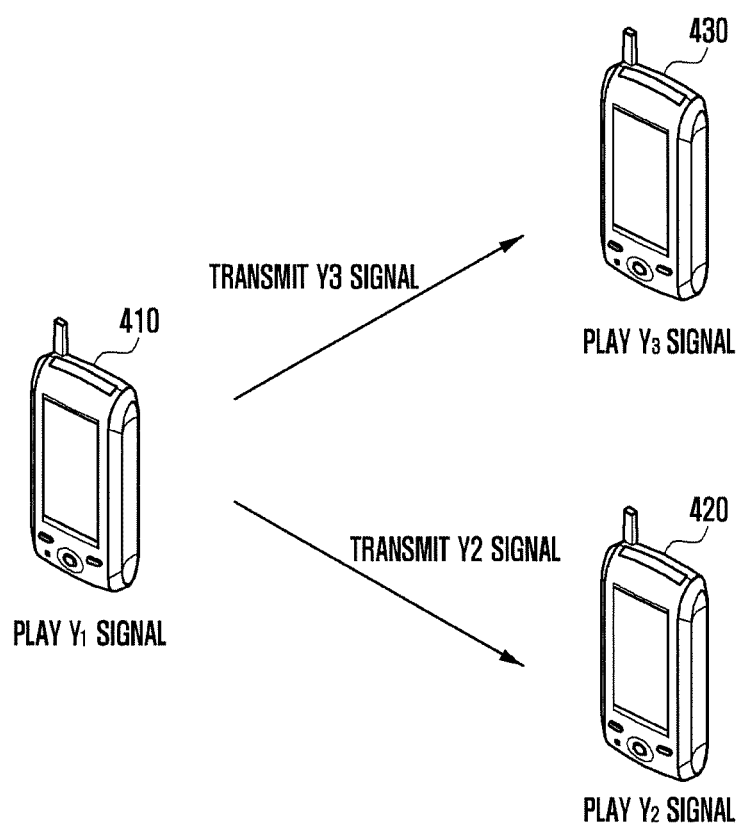
FIG. 4 illustrates is a diagram of the principle of audio playback system according to an embodiment of the present disclosure.

FIG. 4 illustrates a diagram of the principle of audio playback system according to an embodiment of the present disclosure.

Referring to FIG. 4, the audio playback system according to an embodiment of the present disclosure may include the first audio output device 410 storing a music file (i.e. audio data) and the second and third audio output devices 420 and 430 connected to the first audio output device 410. The first audio output device 410 perform splitting the music into three sound sources (e.g. modified audio signals) for use in playback at the three audio output devices simultaneously.

The first audio output device 410 may generate the modified audio signals Y1, Y2, and Y3 fit for the respective audio devices. The first audio output device 410 sends the second and third modified audio signals Y2 and Y3 to the second and third audio output devices 420 and 430, respectively.

According to an embodiment, the first modified audio signal may be the audio signal of voice information extracted from the music file, the second modified audio signal the right channel signal except for the voice information, and the third modified audio signal the left channel signal except for the voice information, without limitation thereto.

The first audio output device 410 may control such that the audio output devices play the sound sources split from the audio data simultaneously. For example, the first to third audio output devices 410, 420, and 430 may play the modified audio signals designated therefor respectively based on the synchronization information.

Figure 5:
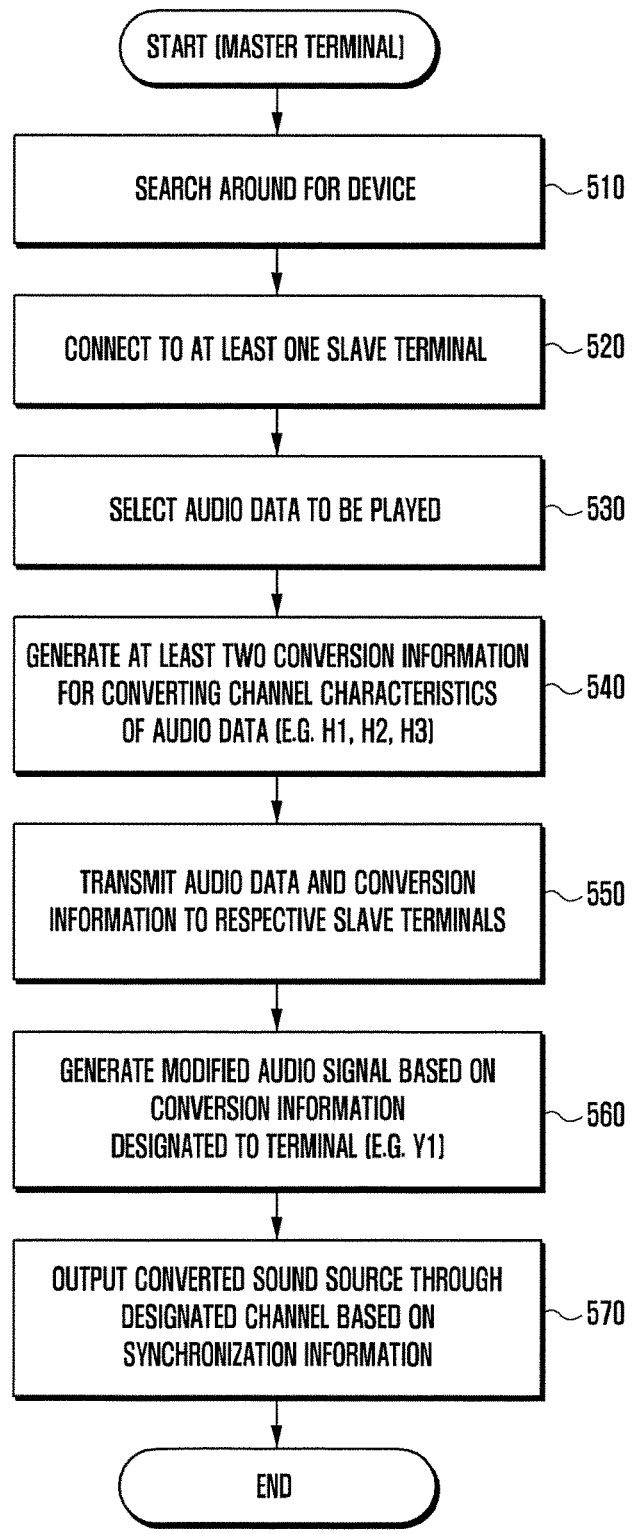
FIG. 5 illustrates a process of the operation procedure of the master terminal according to an embodiment of the present disclosure.
Figure 6:
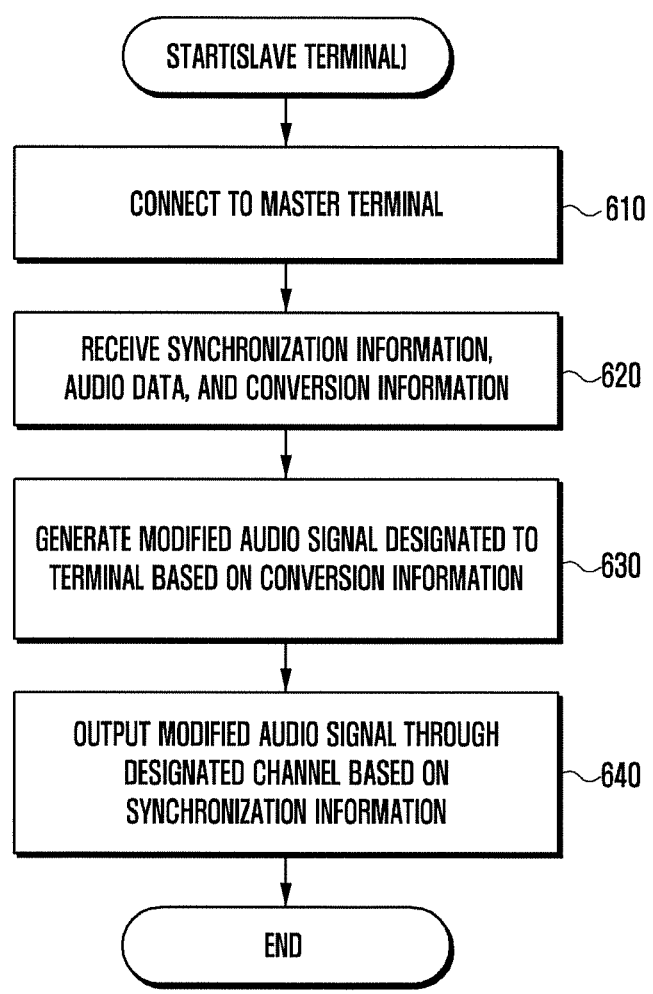
FIG. 6 illustrates a process of the operation procedure of the slave terminal according an embodiment of the present disclosure.

FIGS. 5 and 6 illustrate processes of audio output control methods according to various embodiments of the present disclosure. FIG. 5 illustrates a process of the operation procedure of the master terminal, and FIG. 6 illustrates a process of the operation procedure of the slave terminal.

Referring to FIG. 5, the master terminal searches around for nearby audio output devices (i.e. slave terminals) capable of wired/wireless communication at operation 510. Here, the nearby audio output devices include, without limitation thereto, communication devices equipped with a radio communication function and audio output devices connected through wired links.

The master terminal establishes a connection with at least one slave terminal at operation 520. If a connection request for communication with the slave terminal is detected, the master terminal performs recognition of the slave terminal.

The master terminal detects an input of selecting the audio data to be played in collaboration with the connected slave terminal at operation 530.

The master terminal converts the channel characteristics of the selected audio data and generates a plurality of conversion information to split the audio data into various sound sources.

The conversion information may include the conversion matrix information for generating audio signal of specific sound source. The conversion information may include the information for converting the audio signal to one or more channels. The conversion information may include the audio channels different from the original audio channels of the audio data. The conversion information may be generated using at least one of audio playback application program information, user-designated option information, slave terminal location information, and slave terminal audio output channel information.

According to an embodiment, if the master terminal is connected to two slave terminals, the master terminal may generate the first conversion information (H1) for conversion to the audio signal to be played by the master terminal, the second conversion information (H2) for conversion to the audio signal to be played by the first slave terminal, and the third conversion information (H3) for conversion to the audio signal to be played by the second slave terminal.

The master terminal sends the at least one connected slave terminal the audio data to be played and the conversion information at operation 550. The conversion information transmitted to the slave terminal may be determined differently depending on the channel information designated for the slave terminal.

According to an embodiment, the master terminal transmits the audio data to be played and the second conversion information (H2) to the first slave terminal and the audio data to be played and the third conversion information (H3) to the second slave terminal.

The master terminal generates the modified audio signal (Y1) based on the first conversion information (H1) designated for its own use at operation 560. The modified audio signal may be the audio signal having one or more channels. The modified audio signal may include audio signal output channel information. The master terminal may perform linear filtering to generate the modified audio signal based on the conversion information.

According to an embodiment, the master terminal may generate the modified audio signal by performing the conversion information-based filtering process, sound source extraction and separation process, and signal mix process.

The master terminal outputs the modified audio signal (Y1) generated based on the first conversion information and the synchronization information at operation 570. Here, the synchronization information may be the information for playback of the audio data in synchronization with the slave terminals. The synchronization information may be generated based on at least one of the wired/wireless communication capability information, music playback program capability information, and modified audio signal size information.

The slave terminal connected to the master terminal may convert the audio file transmitted by the master terminal based on the conversion information to generate and output the modified audio signal simultaneously.

A description is made of the operation procedure of the slave terminal in collaboration with the master with reference to FIG. 6 hereinafter.

Referring to FIG. 6, the slave terminal establishes a connection with the master terminal at operation 610. If a connection request for communication with the master terminal, the slave terminal recognizes the master terminal.

The slave terminal receives synchronization information, audio data, and conversion information. Here, the audio data may be the original audio data stored in the storage unit of the master terminal. The conversion information may be the information for use in generating the modified audio signal designated for the slave terminal. The conversion information may include the conversion matrix information for generating the modified audio signal derived from specific sound source. The conversion information may include the information for converting the audio into one or more channels.

The slave terminal generates the modified audio signal based on the received conversion information at operation 630. The modified audio signal may be generated by performing the conversion information-based filtering process, sound source extraction and separation process, and signal mix process. The modified audio signal may include output channel information of the audio signal. The modified audio signal may be the audio signals having one or more channels.

According to an embodiment, the slave terminal may perform linear filtering based on the conversion matrix included in the conversion information to generate the modified audio signal.

The slave terminal outputs the modified audio signal in synchronization with the playback timing of the master terminal based on the synchronization information at operation 640.

Figure 7:
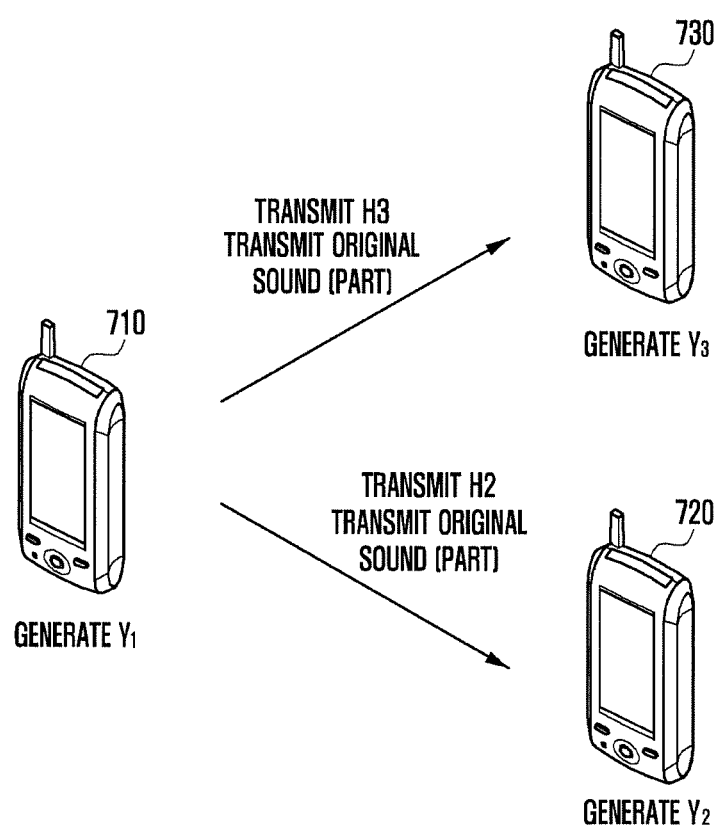
FIG. 7 illustrates a diagram of the principle of audio playback system according various embodiments of the present disclosure.

FIG. 7 illustrates a diagram of the principle of audio playback system according various embodiments of the present disclosure.

Referring to FIG. 7, the audio playback system according to an embodiment of the present disclosure may include the first audio output device 710 storing music file (i.e. audio data) and the second and third audio output devices 720 and 730 connected to the first audio output device 710.

The first audio output device 710 generates conversion information for splitting the music file into three sound sources for playing the music file in collaboration with the nearby audio output devices 720 and 730. The first audio output device 710 may generate the first conversion information (H1) designated for the first audio output device, the second conversion information (H2) designated for the second audio output device 720, and the third conversion information (H3) designated for the third audio output device 730.

The first audio output device 710 transmits the music file to be played and the second conversion information (H2) to the second audio output device 720 and transmits the music file to be played and the third conversion information (H3) to the third audio output device.

Then the first audio output device 710 generates the first modified audio signal (Y1) based on the first conversion information. The second audio output device 720 generates the second modified audio signal (Y2) based on the second conversion information (H2). The third audio output device 730 generates the third modified audio signal (Y3) based on the third conversion information (H3).

Here, the first modified audio signal (Y1), the second modified audio signal (Y2), and the third modified audio signal (Y3) may differ from the channels and audio signals supported by the sound source file stored in the first audio output device 710.

The first audio output device 710, the second audio output device 720, and the third audio output device 730 may generate and play the modified audio signals based on the synchronization information.

Figure 8:
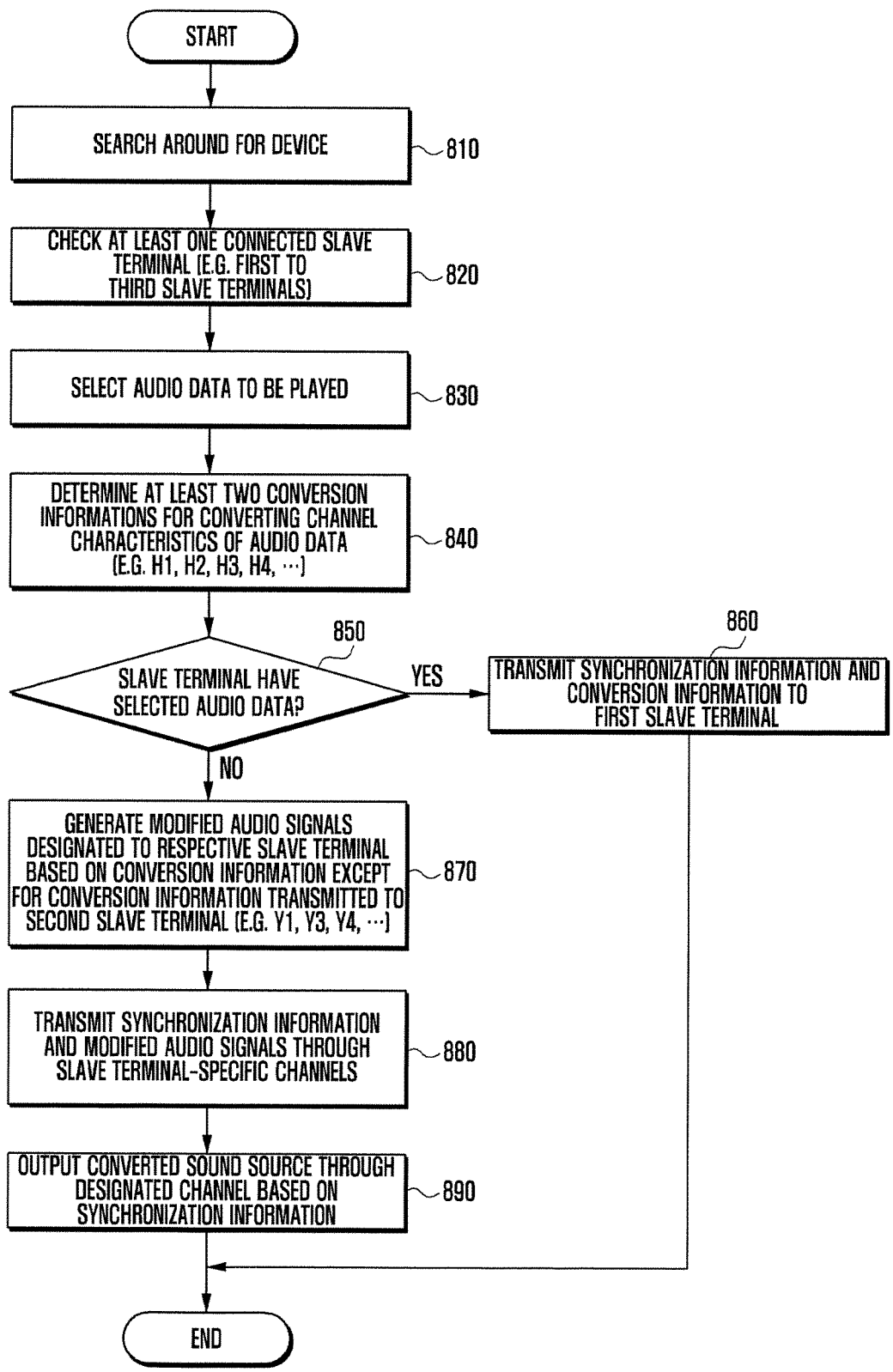
FIG. 8 illustrates a process of the audio output control method according to various embodiments of the present disclosure.

FIG. 8 illustrates a process of the audio output control method according to various embodiments of the present disclosure.

Referring to FIG. 8, the master terminal searches around for the audio output devices capable of wired/wireless communication (i.e. slave terminals). Here, the audio output device may include, without limitation thereto, a communication device equipped with radio communication function and an audio output device connected through a wired link.

The master terminal may establish a connection with at least one slave terminal at operation 820. If a connection request for communication with the slave terminal is detected, the master terminal may perform salve terminal recognition operation.

The master terminal detects an input for selecting the audio data to be played in cooperation with the connected salve device at operation 830.

The master terminal modifies the channel characteristics of the selected audio data and generates a plurality of conversion information for separating various sound sources from the audio data.

The master terminal determines whether the slave terminal has the audio data to be played at operation 850.

According to an embodiment, the master terminal receives a sound source file list from the slave terminal and compares the selected audio data and the audio data included in the sound source file list to determine whether the audio data has match in the list.

If the audio data has a match in the list, the master terminal sends the corresponding slave terminal the designated allocation information and synchronization information at operation 860.

In an example embodiment, where the master terminal is connected to at least three audio output devices, if the first slave terminal has the audio data to be played in collaboration with the master terminal, the master terminal may transmit the conversion information (2) designated for the first slave terminal and the synchronization information to the first slave terminal. Then the first slave terminal converts the audio data stored in its storage to the second modified audio signal (Y2) based on the received conversion information and outputs the second modified audio signal (Y2) according to the synchronization information.

According to an embodiment, the master terminal may check the capability information of the connected audio output devices to discriminate between the audio data conversion-capable audio output devices and the audio data conversion-incapable audio output devices. The master terminal transmits the audio data and conversion information to the audio data conversion-capable audio output devices and transmits the audio data converted by the master terminal to the audio data conversion-incapable audio output devices.

The master terminal generates the audio signals converted in the formats designated for the respective terminals based on the conversion information with the exception of the conversion information transmitted to the first slave terminal at operation 870.

For example, the master terminal generates the first modified audio signal (Y 1) based on the first conversion information (H1) designated for the master terminal, the third modified audio signal (Y3) based on the third conversion information (H3) designated for the second slave terminal, and the fourth modified audio signal (Y4) based on the fourth conversion information (H4) designated for the third slave terminal.

The master terminal transmits the synchronization information and modified audio signals to the corresponding slave terminals respectively at operation 880.

The master terminal outputs the audio signal converted for it (e.g. Y1) among the modified audio signals based on the synchronization information at operation 890. The slave terminals connected to the master terminal may play the modified audio signals in synchronization with the playback timing of the master terminal based on the synchronization information.

Figure 9:
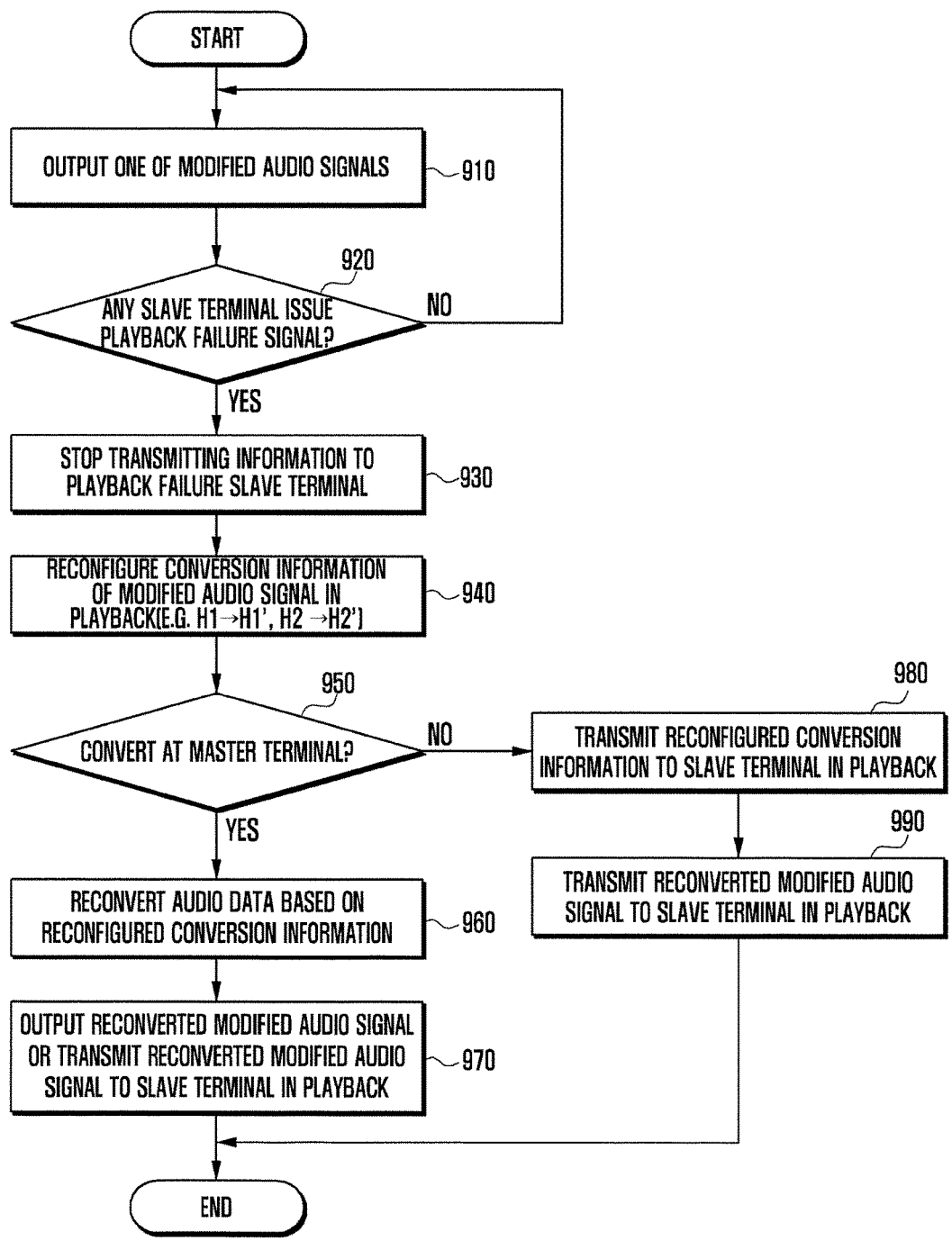
FIG. 9 illustrates a process of the audio output control method according to various embodiments of the present disclosure.

FIG. 9 illustrates a process of the audio output control method according to various embodiments of the present disclosure.

Referring to FIG. 9, the master terminal transfers the modified audio signals to the connected slave terminals respectively to play the music file at operation 910. The master terminal may output one of the modified audio signals generated by it.

According to an embodiment, the master terminal outputs the first modified audio signal. The first slave terminal may output the second modified audio signal while the second slave terminal outputs the third modified audio signal.

The master terminal determines whether any salve terminal fails playing the audio signal at operation. If a call signal request is input from the outside, the slave terminal may send the master terminal the information notifying of the occurrence of the call signal request.

If the call signal request notification information is received from the slave terminal, the master terminal stops transferring the sound source information (e.g. converted signal and conversion information) in playback to the slave terminal at operation 930. The master terminal may send other slave terminals the information notifying of the playback stop at the corresponding slave terminal.

If the playback stop signal is received from the slave terminal, the master terminal updates the conversion information of the audio file in playback at operation 940.

According to an embodiment, if the playback stop signal is issued by the first slave terminal which is outputting the second audio signal, the master terminal may reconfigure the first and third conversion information (H1→H1' and H2→H2') in order for the master terminal and the second slave terminal to extract and play the audio data.

The master terminal determines whether to convert the audio data by itself at operation 950.

According to an embodiment, the master terminal may convert the audio data based on the conversion information designated for the respective slave terminals and send the modified audio signals to the corresponding slave terminals. Then the slave terminal may output the modified audio signals received from the master terminal through the corresponding channels.

According to an embodiment, the master terminal may transmit the conversion information designated for the respective slave terminal and audio data to the corresponding slave terminals in order for the respective slave terminals to convert the audio data.

According to an embodiment, the master terminal may check the capabilities of the connected audio output devices to transmit the audio data and the conversion information to the audio data conversion-capable audio output devices and transmit the audio signal converted by the master terminal to the audio data conversion-incapable audio output devices to play the modified audio signal.

If the audio data is converted by the master terminal, the master terminal may convert the audio data again to generate the modified audio signal based on the reconfigured conversion information at operation 960.

According to an embodiment, the master terminal generates the first modified audio signal (Y1→Y1') based on the reconfigured conversion information (H1') and the third modified audio signal (Y3→Y3') based on the reconfigured conversion information designated for the third master terminal. One of the first and third modified audio signals may include the channel information and sound source information of the second modified audio signal designated and played by the first slave terminal.

The master terminal may transmit the re-modified audio signal to the slave terminal playing audio signal currently or output the re-modified audio signal designated for it at operation 970.

Otherwise if the audio data is not converted by the master terminal, the master terminal transmits the reconfigured conversion information to the slave terminal (e.g. the second slave terminal) which is playing the audio data currently at operation 980. In this embodiment, the slave terminal re-converts the audio data stored its storage based on the reconfigured conversion information to generate and paly the modified audio signal.

Figure 10:
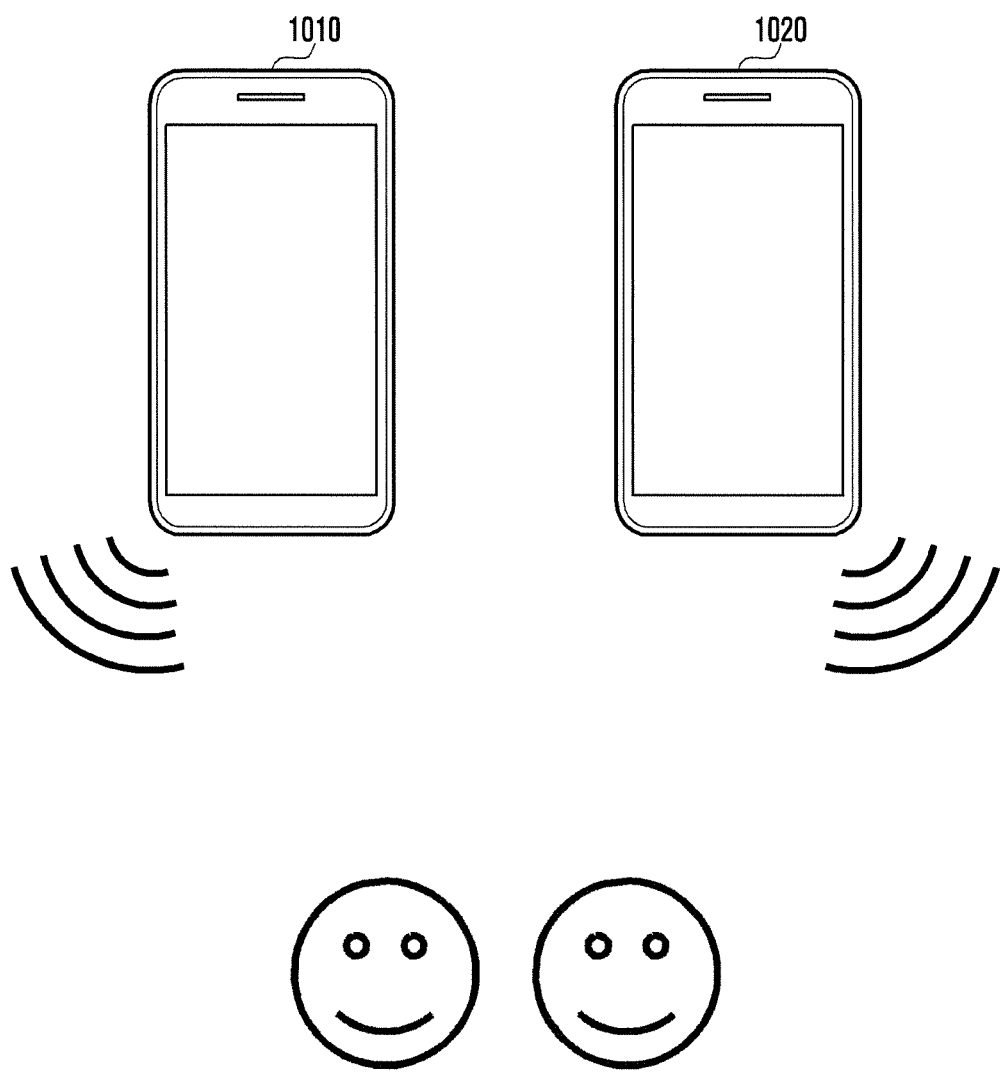
FIG. 10 illustrates a diagram of an example situation where two audio output devices collaborate to play a sound resource according to an embodiment of the present disclosure.
Figure 11:
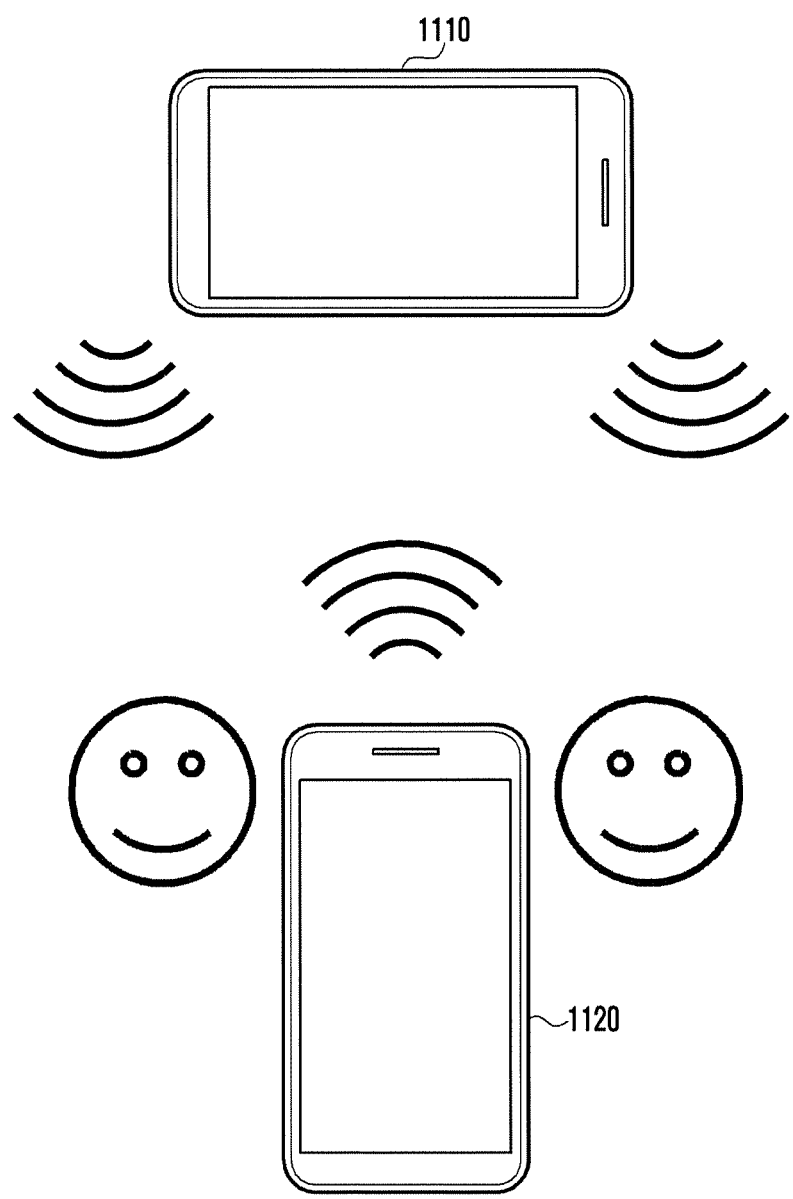
FIG. 11 illustrates a diagram of an example situation where two audio output devices collaborate to play a sound resource according to another embodiment of the present disclosure.
Figure 12:
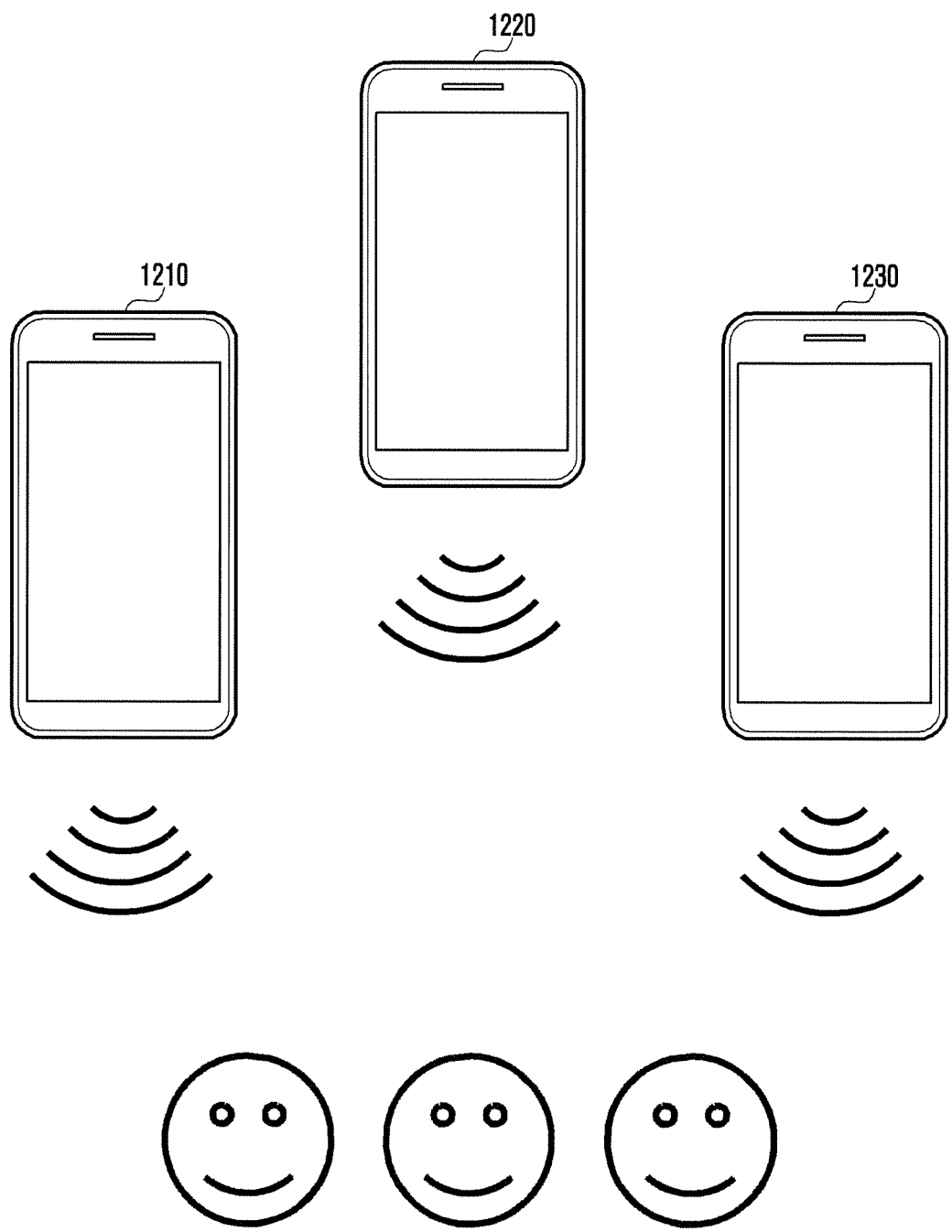
FIG. 12 illustrates a diagram of an example situation where three audio output devices collaborate to play a sound resource according to an embodiment of the present disclosure.
Figure 13:
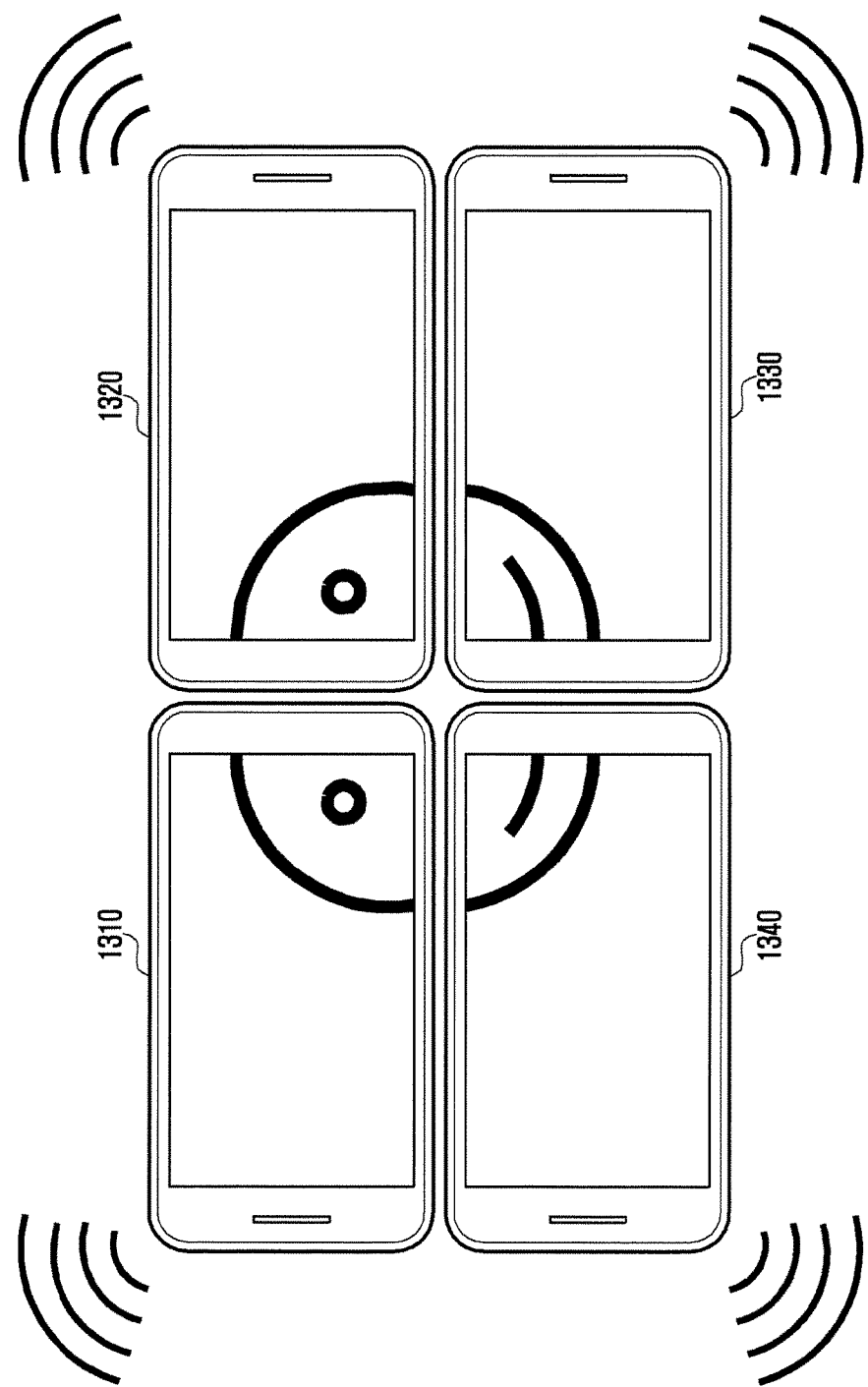
FIG. 13 illustrates a diagram of an example situation where four audio output devices collaborate to play a sound resource according to an embodiment of the present disclosure.

FIGS. 10 to 13 illustrate diagrams of example sound resource playback situations using a plurality of audio output devices according to various embodiments of the present disclosure. FIGS. 10 and 11 show examples where two audio output devices collaborate to play a sound resource, FIG. 12 shows an example where three audio output devices collaborate to play a sound source, and FIG. 13 shows an example where four audio output devices collaborate to play a sound source.

The audio output device according to various embodiments of the present disclosure is connected to nearby audio output devices to output the audio data in various sound source formats. A description is made of the playback of specific sound source in different conversion modes with examples.

As shown in FIG. 10, the first and second terminals 1010 and 1020 may output the modified audio signals designated for left channel and right channel respectively while maintaining synchronization. For example, the first terminal 1010 converts a specific sound source to the first modified audio signal based on the first conversion information, and the second terminal 1020 converts the specific sound source to the second modified audio signal based on the second conversion information. Here, the first terminal 1010 is assigned the left channel, and the second terminal 1020 is assigned the right channel. The first and second terminals 1010 and 1020 may output the modified audio signals through the channel allocated simultaneously based on the synchronization information. In this embodiment, the first and second modified audio signals are single channel information.

As shown in FIG. 11, the first terminal 1110 may output two channel audio signals, and the second terminal 1120 may output a single audio signal. In this embodiment, the modified audio signals assigned to the first terminal 1110 may be a left channel signal and right channel audio signal, and the modified audio signal assigned to the second terminal 1120 may include the signal extracted as specific sound source (e.g. voice soured).

Here, the first terminal 110 may be assigned the left and right channels, the second terminal 1120 the center channel. The first terminal 1110 is designated the first modified audio signal generated by converting a specific sound source based on the first conversion information, and the second terminal 1120 is designated the second modified audio signal generated by converting the specific sound source based on the secondary conversion information. The first modified audio signal may be two-channel information while the second modified audio signal may be single channel information.

As shown in FIG. 12, the first terminal 1210, the second terminal 1220, and the third terminal 1230 may output the audio signals designated respectively. In this embodiment, the modified audio signal designated to the first terminal 1210 may include the signal extracted as the first voice source of the sound source file, and the modified audio signal designated to the third terminal 1230 may include the signal extracted as the second voice source of the sound source file. The modified audio signal 1220 designated to the second terminal may include the signal extracted as background sound source with the exception of the first and second voice sources of the sound source file.

As shown in FIG. 13, the first terminal 1310, the second terminal 1320, the third terminal 1330, and the fourth terminal 1340 may be arranged to make up a screen display. The first to fourth terminals 1310 to 1340 may be connected among each other through wired/wireless links for communication. The first terminal 1310 may be configured as the master terminal having a motion picture file (e.g. audio and video data) and the second to fourth terminal 1320 to 1340 as slave terminals.

The first terminal 1310 is connected to the second to fourth terminals 1320, 1330, and 1340, converts the audio data included in the motion picture file to the modified audio signals designated for the respective terminals, and transmits the modified audio signals to the respective terminals. The first terminal 1310 also transmits the terminal-specific conversion information and audio data to the respective terminals such that the terminals are capable of generating the modified audio signals based on the conversion information and output the modified audio signals.

According to an embodiment, the first terminal 1310 may control such that the video is split into sections to be presented by the respective terminals to share the video data with the second to fourth terminals 1320, 1330, and 1340.

As shown in FIG. 13, if four terminals make up one screen display, the first to fourth terminals 1310 to 1340 may output the terminal-specific modified audio signals respectively. In this embodiment, the modified audio signal designated to the first terminal 1310 may include the left channel signal, and the modified audio signal designated to the second terminal 1320 may include the right channel signal. The modified audio signals designated to the third and fourth terminals 1330 and 1340 may include the signal acquired by extracting voice source as specific sound source (e.g. voice source).

As described above, the audio output control method and apparatus of the present disclosure generates audio signals by converting the channel characteristics of a multichannel sound source file to the formats suitable for a plurality of audio output devices and playing the audio signals by means of designated audio output devices so as to provide 3D audio service.

Also, the audio output control method and apparatus of the present disclosure extracts an audio signal corresponding to a specific audio channel from a multichannel sound source file and modifying the audio signal so as to provide audio service fulfilling the user requirements.

Also, the audio output control method and apparatus of the present disclosure is advantageous in terms of providing audio service in various formats adaptive to deployment of a plurality of audio output devices.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An audio output control method of an audio output device connected to at least one other audio output device, the method comprising:
    establishing a connection for communication with at least one other audio output device through a wireless communication unit;
    identifying a respective location of the connected at least one other audio output device based on a location of the audio output device;
    generating at least two separated audio signals designated to respective audio output devices using conversion information generated according to the identified respective location of the connected at least one other audio output device, by splitting audio data into a plurality of sound sources;
    in response to a playback request for the audio data, playing one of the at least two separated audio signals generated corresponding to the location of the audio output device among the at least two separated audio signals; and
    transmitting other audio signal generated corresponding to a respective location of the at least one other audio output device to the connected at least one other audio output device,
    wherein the at least two separated audio signals comprise at least one of sound sources selected among the plurality of sound sources according to channel characteristics of the respective audio output devices and the location of the respective audio output devices.

2. The method of claim 1, wherein the conversion information comprises information on channel configuration changed according to location information of the at least one other audio output device.

3. The method of claim 1, wherein the generating of the at least two separated audio signals comprises at least one of a conversion information-based filtering process, a sound source extraction and splitting process, and a signal mix process, to generate at least one modified audio signal.

4. The method of claim 1, wherein at least one of the at least two separated audio signals comprises audio signals comprising respective channel information corresponding to respective audio output devices.

5. The method of claim 1, wherein the generating of the at least two separated audio signals comprises:
    transmitting, when the at least one other audio output device has specific audio data, the conversion information designated to the other audio output device comprising the specific audio data in order for the respective audio output devices to generate the at least two separated audio signals based on the conversion information; and
    transmitting, when the at least one other audio output device does not comprise the specific audio data, the conversion information and the audio data to the other audio output device to which the conversion information is designated in order for the respective audio output devices to generate the at least two separated audio signals.

6. The method of claim 1, wherein the playing of the one of the at least two separated audio signal comprises playing separated other audio signals in synchronization with playback timing of modified audio signals transmitted to the at least one other audio output device.

7. The method of claim 1, wherein the playing of one of the at least two separated audio signals further comprises transmitting the audio data, the conversion information, and the other audio signals in a streaming mode, the at least two separated audio signals being converted and played in real time.

8. The method of claim 1, further comprising, after the playing of the at least one of the at least two separated audio signals:
    reconfiguring, after a playback stop signal is issued by the at least one audio output device, the conversion information on the audio data in playback; and
    regenerating the at least two separated audio signals based on the audio data and the reconfigured conversion information.

9. A audio output device comprising:
    a speaker configured to output audio signals;
    a communication unit configured to establish a connection for communication with at least one other audio output device;
    a storage unit configured to store at least one of audio data and conversion information and at least two separated audio signals for playing the audio data in collaboration with the at least one other audio output device; and
    a control unit configured to control identifying, when the audio output device is connected with at least one other audio output device, a respective location of the connected at least one other audio output device based on a location of the audio output device, generating at least two separated audio signals designated to the respective audio output devices using conversion information generated according to the identified respective location of the connected at least one other audio output device, by splitting the audio data into a plurality of sound sources, in response to a playback request for the audio data, playing one of the at least two separated audio signals generated corresponding to the location of the audio output device among the at least two separated audio signals, and transmit the other audio signals generated corresponding to a respective location of the other audio output device to the connected at least one other audio output device, wherein the at least two separated audio signals comprise at least one of sound sources selected among the plurality of sound sources according to channel characteristics of the respective audio output devices and the location of the respective audio output devices.

10. The device of claim 9, wherein the control unit is configured to control generating information on channel configuration changed according to location information of the at least one other audio output device.

11. The device of claim 9, wherein the control unit is configured to control to perform at least one of a conversion information-based filtering process, a sound source extraction and splitting process, and a signal mix process, to generate the at least two separated audio signals.

12. The device of claim 9, wherein at least one modified audio signal comprises audio signals having respective channel information corresponding to respective audio output devices.

13. The device of claim 9, wherein the control unit is configured to control transmitting, when the at least one other audio output device comprises the audio data, the conversion information designated to the other audio output device comprising the audio data in order for the respective audio output devices to generate the at least two separated audio signals based on the conversion information, and transmitting, when the at least one other audio output device does not comprise the audio data, the conversion information and the audio data to the audio output device to which the conversion information is designated in order for the respective audio output devices to generate the at least two separated audio signals.

14. The device of claim 9, wherein the control unit is configured to control playing the one audio signal in synchronization with playback timing of the at least two separated audio signals transmitted to the at least one other audio output device.

15. The device of claim 9, wherein the control unit is configured to control reconfiguring, when a playback stop signal is issued by the at least one audio output device after the playing of one of the at least two separated audio signal, the conversion information on the audio data in playback and regenerating the at least two separated audio signals based on the audio data and the reconfigured conversion information.

* * * * *